UNITED STATES PATENT OFFICE.

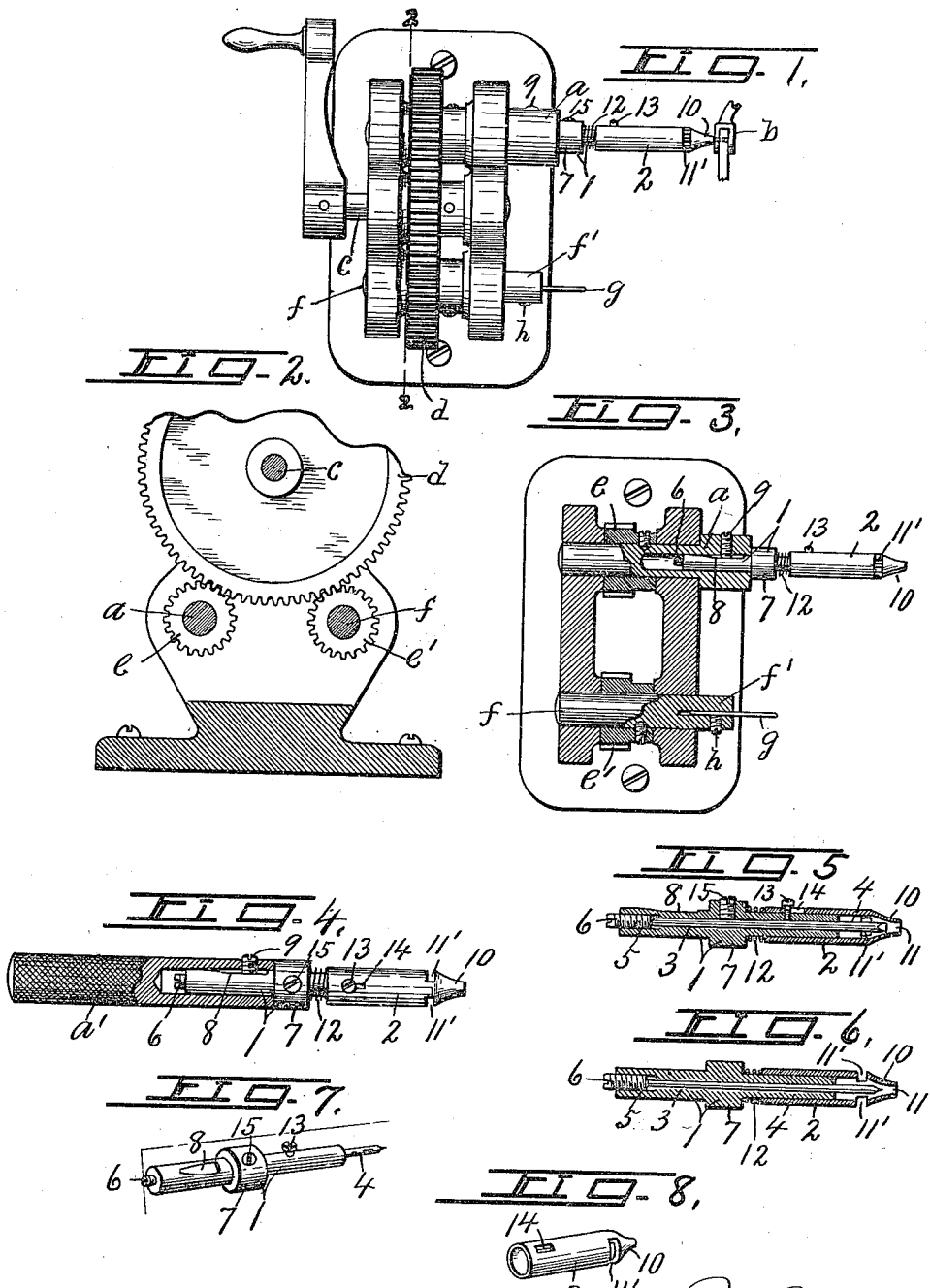

PHILIAS J. BOUCHER, OF GENEVA, NEW YORK, ASSIGNOR TO THE STANDARD OPTICAL COMPANY, OF GENEVA, NEW YORK, A CORPORATION OF NEW YORK.

TOOL-HOLDER.

1,141,864.      Specification of Letters Patent.      Patented June 1, 1915.

Application filed January 9, 1913. Serial No. 740,953.

*To all whom it may concern:*

Be it known that I, PHILIAS J. BOUCHER, of Geneva, in the county of Ontario, in the State of New York, have invented new and useful Improvements in Tool-Holders, of which the following, taken in connection with the accompanying drawings, is a full, clear, and exact description.

This invention relates to certain improvements in tool holders and, while it is adapted more particularly for applying or removing screws to and from lens mountings and other articles of manufacture in which various parts thereof are assembled by screws, it is evident that it may be used for holding drills, taps and boring tools where it is desired to limit the depth of the bore or tap.

The difficulties, attending the common practice of applying and removing extremely small screws to and from relatively small articles of manufacture—such, for example, as lens mountings—are well known to those skilled in this art and that such operations not only require considerable skill and clearness of vision, particularly in centering or alining the screws with the holes in which they are adapted to enter, but even with the most skilled practice, considerable time and labor is expended in properly applying screws with the attendant liability of stripping the threads or breaking the lenses by overtightening. Furthermore the working ends or point of such tools, which are necessarily very small, are more or less liable to become broken or dull by contact with other objects when not in use and one of the main objects of this invention is to provide the tool holder with a tool protecting medium or guard which may also serve as a means for centering or alining the work with the tool and also as a means for picking up and temporarily holding small screws in registration with a coaxial driver preparatory to entering such screw into the screw holes of a lens mounting or other article of manufacture requiring the use of comparatively small screws.

Another object is to utilize this same device as a depth gage and limiting stop to limit the action of the driver upon the screw or in the case of a drill, tap or boring tool to limit the depth of entrance of such tool into the work and also to force the work from the tool under yielding pressure when withdrawing the tool from such work.

A further object is to provide means for adjusting the tool axially relatively to the guard so as to vary the time of automatic releasing the screw driver from the head of the screw or to vary the depth of tap or bore when a drill or tap is used.

A still further object is to provide the guard with clearance passages for burs and chips which may be loosened in the operation of the tool upon the work.

Other objects and uses will be brought out in the following description.

In the drawings—Figure 1 is a top plan of a power driven machine showing my improved tool holder as applied thereto. Fig. 2 is a vertical sectional view of the same machine taken on line 2—2, Fig. 1, the upper portion of the large gear being broken away. Fig. 3 is a horizontal sectional view through the frame of the machine in the plane of the tool-carrying spindles, portions of said spindles being, together with the pinions thereon, shown in section. Fig. 4 is an elevation of my improved tool holder shown as applied to a handle to be used as a screw driver. Figs. 5 and 6 are longitudinal sectional views of the detached tool holder taken at right angles to each other. Fig. 7 is a perspective view of the detached tool-holding chuck. Fig. 8 is a perspective view of the detached guard sleeve.

This tool holder is adapted to be secured to one of the spindles as —a— of a power driven machine, as shown in Figs. 1, 2 and 3, or to one end of a handle —a'—, as shown in Fig. 4, and comprises a hollow tubular chuck —1— and a guard sleeve —2—.

As shown in the drawings, the chuck is provided with a central lengthwise cylindrical opening —3— extending from end to end for receiving, in this instance, the cylindrical shank of a screw driver —4—, one end of the central opening —3— being enlarged and threaded interiorly to form a threaded socket —5— for receiving a tool-adjusting screw —6— which is adapted to engage the adjacent end of the shank of the screw driver —4— for adjusting said screw driver endwise relatively to the sleeve —2— as will be hereinafter more fully described.

The central portion of the chuck —1— is provided with an annular enlargement —7—, the opposite ends being substantially cylindrical and about the same diameter except that the end having a threaded socket therein, as —5—, constitutes a shank adapted to be inserted in the outer end of the spindle —a— and is provided with a flattened surface —8— in one side adapted to be engaged by a set screw —9— by which the chuck is held in the spindle —a— against relative rotation or axial movement, the annular enlargement —7— forming a shoulder for limiting the movement of the shank into the supporting spindle —a—.

The guard —2— consists of a tubular sleeve fitted with an easy sliding fit upon the outer cylindrical end of the chuck —1— concentric therewith and is provided with a reduced tapering end —10— having an opening —11— therein of just sufficient size to receive the head of a screw of predetermined size and also capable of permitting the passage of the working end of the screw driver therethrough.

The portion of the sleeve —2— near the base of the tapering end —10— is provided with one or more, in this instance, diametrically opposite openings or channels —11'— constituting clearance passages for burs or chips which may be separated from the screw or other work operated upon by the tool —4—.

The outer end of the sleeve normally projects some distance beyond the point or working end of the screw driver —4— and entirely surrounds the same to protect it from injury by contact with external objects, said sleeve being yieldingly held in its normal position by a spring —12— which is interposed between the inner end of the sleeve and adjacent end of the annular enlargement —7— as shown more clearly in Figs. 4 and 5.

The outward movement of the sleeve is limited by a screw stop —13— which passes through an elongated slot —14— in one side of the sleeve and engages in a threaded aperture in the corresponding side of the adjacent end of the chuck, the slot —14— permitting the sleeve to be pressed axially and inwardly against the action of the spring —12— by contact with the work or object into which the screw is driven by the driver —4— when such object, as for example, a lens mounting is pressed toward the working end of the driver as in the use of the machine shown in Figs. 1, 2 and 3, or by forcing the driver toward the object by the hand tool shown in Fig. 4.

The screw driver is adjusted by means of the screw —6— so that its working end projects some distance beyond the outer end of the chuck and a sufficient distance inwardly from the outer tapering end of the sleeve to permit the head of a screw to be readily inserted into said tapering end for temporarily holding the screw preparatory to alining it with and driving it into the screw hole of a lens mounting or other article as —b— into which the screw is to be passed and is held by a set screw —15—.

The head of the screw is easily and quickly placed by hand in the holder or, in some instances, as, for example, lens clamps having opposite ears provided with screw openings, one only of which is threaded, the threaded end of the screw may be readily inserted by hand through the unthreaded aperture and temporarily supported thereby. While in this position, the mounting is placed by hand against the end of the tool sleeve —2— with the head of the screw entering the tapering end of the sleeve and by pressing the mounting against the ends of the sleeve, the latter will be forced inwardly against the action of the spring —12— and then by rotating the screw driver —4—, it will quickly seat itself in the slot in the head of the screw and thereby rotate the screw into screwing engagement with the mounting.

The entrance of the screw into the mounting is comparatively easy and without perceptible resistance until the head of the screw engages the adjacent face of the mounting, whereupon the increased resistance tending to rotate the mounting in the hand of the operator warns the operator to relieve the pressure and allow the spring-actuated sleeve to force the mounting with the screw therein away from the working end of the driver. This entire operation of seating the screw into the mounting by means of the power driven means, shown in Figs. 1, 2 and 3, is practically instantaneous, but it is evident that whether the driver is operated by such machine or by the hand driver, shown in Fig. 4, the operator can readily determine by the sense of feeling when the screw is set up sufficiently tight to avoid any possibility of stripping the threads or breaking the glass which may be clamped by the mounting.

The slot —14— is sufficiently long to allow the screw to be set up firmly before the sleeve reaches the limit of its inward movement under the hand pressure of the mounting against the end thereof so that, if it is desired to loosen the screw from the mounting, its head may be reinserted in the outer end of the sleeve and sufficient pressure brought to bear upon the mounting to force the sleeve inwardly during the rotation of the driver until the latter engages in the slot in the screw whereupon the reverse rotation of the driver from that previously described will withdraw the screw from the mounting and the sleeve will temporarily hold such screw until it is desired to reinsert it in the mounting.

It is apparent from the foregoing description that the handle —a'— serves a purpose similar to that of the spindle —a— as a holder for the chuck and, together with the tool holder, constitutes a convenient hand screw driver with the additional advantage that it may be used to pick up screws by the head when separated and fed head foremost by any suitable separating and feeding device not necessary to herein illustrate or describe.

The screws may be picked up by hand and inserted head foremost into the end of the sleeve which becomes a temporary holder for the screw and enables it to be more accurately alined with and inserted into the screw openings of a mounting or other object.

The machine shown in Figs. 1, 2 and 3 may be operated by hand or other power applied to the shaft —c— of a relatively large gear —d— which meshes with an underlying pair of pinions —e— and —e'—, the latter being mounted respectively upon the spindle —a— and a separate spindle —f—.

It is sometimes necessary to tap a screw hole prior to driving the screw therein and for this purpose, I have provided one end of the spindle —f— with a chuck —f'— for receiving a tap —g— which is held in place by a set screw —h— as shown more clearly in Figs. 1 and 3.

I have simply shown this machine as an expeditious means for tapping, mountings or similar objects and applying screws thereto, but the invention lies more particularly in the tool holder and it is evident that instead of using a screw driving tool, it may be substituted by a drill, tap or boring tool, in which case, such tool might be adjusted so as to bring its working point in coincidence with the end face of the outer end of the sleeve —2— so that the entrance of the tap, drill or other boring tool into the work would be gaged by the amount of endwise movement of the sleeve upon the chuck as determined by the length of the slot —14— and, therefore, the sleeve constitutes a yielding stop for limiting the entrance of the screw, tap or drill into the work to prevent overtightening of the screw or excessive entrance of the tap or drill.

What I claim is:

1. A tool holder comprising a chuck having a central lengthwise opening for a tool, an axially adjustable end thrust bearing for one end of the tool, and a work centering sleeve slidable on the chuck relatively to the opposite end of the tool.

2. A tool holder comprising a chuck having a central lengthwise opening for a tool, an axially adjustable end thrust bearing for one end of the tool, and a yielding stop normally projecting beyond the working end of the tool to limit the movement of the tool relatively to the work.

In witness whereof I have hereunto set my hand this ninth day of December, 1912.

PHILIAS J. BOUCHER.

Witnesses:
ALBION W. NEWELL,
WILLIAM J. ESPEY.

Copies of this patent may be obtained for five cents each, by addressing the "Commissioner of Patents, Washington, D. C."